United States Patent
Loew

(10) Patent No.: US 12,520,889 B2
(45) Date of Patent: Jan. 13, 2026

(54) TRANSPARENT MEDICAL FACEMASK COMPOSITE AND FACEMASKS FORMED THEREBY

(71) Applicant: Randolph Julian Loew, Odenton, MD (US)

(72) Inventor: Randolph Julian Loew, Odenton, MD (US)

( * ) Notice: Subject to any disclaimer, the term of this patent is extended or adjusted under 35 U.S.C. 154(b) by 1151 days.

(21) Appl. No.: 17/374,165

(22) Filed: Jul. 13, 2021

(65) Prior Publication Data

US 2022/0007764 A1 Jan. 13, 2022

Related U.S. Application Data

(60) Provisional application No. 63/051,030, filed on Jul. 13, 2020.

(51) Int. Cl.
*A41D 13/11* (2006.01)

(52) U.S. Cl.
CPC .......... *A41D 13/1192* (2013.01); *A41D 13/11* (2013.01)

(58) Field of Classification Search
CPC ........ A41D 13/11–1192; A41D 31/145; A62B 18/00; A62B 23/00
See application file for complete search history.

(56) References Cited

U.S. PATENT DOCUMENTS

| | | | | |
|---|---|---|---|---|
| 5,409,761 | A * | 4/1995 | Langley | ................. B32B 27/32 428/315.7 |
| 2010/0239625 | A1* | 9/2010 | Puckett | .............. A41D 13/1115 424/402 |
| 2015/0122269 | A1* | 5/2015 | Cree | ...................... A41D 13/11 604/366 |
| 2018/0160748 | A1* | 6/2018 | Yoshida | ............... A62B 23/025 |
| 2021/0368890 | A1* | 12/2021 | Brizuela | .................. B32B 3/06 |

FOREIGN PATENT DOCUMENTS

| | | | | |
|---|---|---|---|---|
| CA | 2121371 C | * | 1/2003 | ............. A61L 15/24 |
| WO | WO-2016052401 A1 | * | 4/2016 | ............. A41D 13/11 |

* cited by examiner

*Primary Examiner* — Brandy S Lee
*Assistant Examiner* — Kira B Daher
(74) *Attorney, Agent, or Firm* — Blynn L. Shideler; Krisanne Shideler; BLK Law Group

(57) ABSTRACT

A facemask includes a transparent, clear film, about 0.5 to 3 mils in thickness which is breathable and having microperforations therein; an anti-biological coating on at least one side of the transparent, clear film; and at least one fabric layer coupled via an adhesive layer to the clear film. The facemasks provides a transparent mask for the user that will minimize adverse skin reactions of the wearer due to the use of the fabric layer adjacent the skin.

12 Claims, 2 Drawing Sheets

TRANSPARENT MEDICAL FACEMASK COMPOSITE AND FACEMASKS FORMED THEREBY

RELATED APPLICATIONS

The present application claims the benefit of U.S. Provisional Patent Application Ser. No. 63/051,030 filed Jul. 13, 2020 titled "Transparent Medical Facemask Composite and Facemasks formed thereby" which is incorporated herein by reference.

BACKGROUND OF THE INVENTION

1. Field of the Invention

This invention generally relates to medical facemasks, and in particular to transparent medical facemask composites and the medical facemasks formed thereby.

2. Background Information

Throughout history and across the globe, most facemasks, or simply masks, have served to disguise, cloak or alter identity, whether in the special circumstances of ritual and theater, the perpetuation of crimes or the veiling of women. Medical facemasks, by contrast, are meant not to hide but to protect. A "medical" facemask, or medical mask, within the meaning of the present application, is a facemask intended to protect the health and safety of the user and/or of others around the user The history of face masks stretches back to at least ancient Persia when cloths were held over one's mouth before entering tombs. The Chinese were more creative by including gold fiber in their silk scarfs, and known to be worn by servants of the emperor. Medical face masks in the western world date back to at least the $14^{th}$ century when plague (the Black Death, The Great Mortality, Bubonic Plague) ravaged Europe, beginning in Italian port trading cities (or even earlier in Italian trading posts further east) and generally working clockwise around Europe over a century. Some physicians treating plague victims developed what might be considered the first "Haz-Mat" suit which included a facemask with an elongated nose portion in which sweet smelling flowers could be placed to counteract the bad air thought to be the cause of plague. A portion of a $17^{th}$ century sketch illustrating the mask portion of this early plague suit is repeated as FIG. 1. Leonardo da Vinci suggested that soaked in water textiles would catch the contagion.

The modern use of medical face masks came with the recognition of sanitary and protective apparel becoming necessary to reduce pathogenic contamination. There were early proponents of public use of face masks to minimize contagion spread, for example in an 1878 article printed in the Hospital Gazette and in Scientific American, A. J. Jessup, a Westtown, N.Y., physician, recommended cotton masks to limit contagion during epidemics, "Thus we see that as quarantine and disinfection will certainly spread of contagion from patient to patient, may we not confidently hope, by preventing the entrance of germs into the lungs and blood, by a properly constructed filtering mask to yet witness the spectacle of a population walking about the streets of a cholera infested city, without fear of its infection however deadly. As a properly made cotton filter worn over the mouth and nose must shut out all atmospheric germs of the ordinary putrefactive kind. We may confidently assured that those of disease will be equally excluded."

In 1905, Chicago physician Alice Hamilton publishes an article in the Journal of the American Medical Association, reporting on experiments measuring the amount of streptococci bacteria expelled when scarlet fever patients cough or cry. She also measured the strep bacteria from healthy doctors and nurses when they talk or cough, leading her to recommend masks be worn during surgery.

In 1910, an epidemic of pneumonic plague erupted in Manchuria. Appointed by the Chinese court to head antiplague efforts, the Penang-born, Cambridge-educated physician Wu Lien-Teh argued that the disease is transmitted through airborne contact. Thus to prevent its spread, he develops masks to be worn by medical personnel and the general public and this mask is argued to be the forerunner of the modern N95 mask.

During the 1918 global flu epidemic, inaccurately named the Spanish Flu epidemic, medical personnel routinely adopt masks to protect themselves, and many cities require facemasks to be worn in public. Facial covering masks, generally secured by straps around the ears or the head of the user have become an essential tool for preventing the spread of contagion in major outbreaks, as well as for battling air quality issues (due to systematic air pollution, dust storms, wildfires and the like).

Today, one of the chief interests in producing medical facemasks is the protection of the individual from the spread of contagion as well as not being overcome by it. Moreover, people dislike the anonymous wearer since one cannot discern who is wearing the mask or what emotions are showing. In addition people are succumbing to the allergic effect of synthetic media and are susceptible to allergic reactions.

There remains a need for making medical facemasks that are transparent, efficient and cost effective and minimize allergic reaction.

SUMMARY OF THE INVENTION

The present in is a clear mask composite whereby the wearer can be seen and emotions discerned readily. Moreover, since cotton, a natural fiber, is used to sandwich the clear film, there is much less likelihood of irritating skin and causing a negative reaction.

Specifically the invention provides a facemask includes a transparent, clear film, about 0.5 to 3 mils in thickness which is breathable and having micro-perforations therein; an anti-biological coating on at least one side of the transparent, clear film; and at least one fabric layer coupled via an adhesive layer to the clear film. The facemasks provides a transparent mask for the user that will minimize adverse skin reactions of the wearer due to the use of the fabric layer adjacent the skin.

These and other advantages will be clarified in the following description taken together with the following figures.

DESCRIPTION OF THE PREFERRED EMBODIMENTS

Figure 1:
FIG. 1 is a portion of a $17^{th}$ century sketch illustrating the beaklike medical facemask portion of a middle ages "Plague suit"
Figure 2:
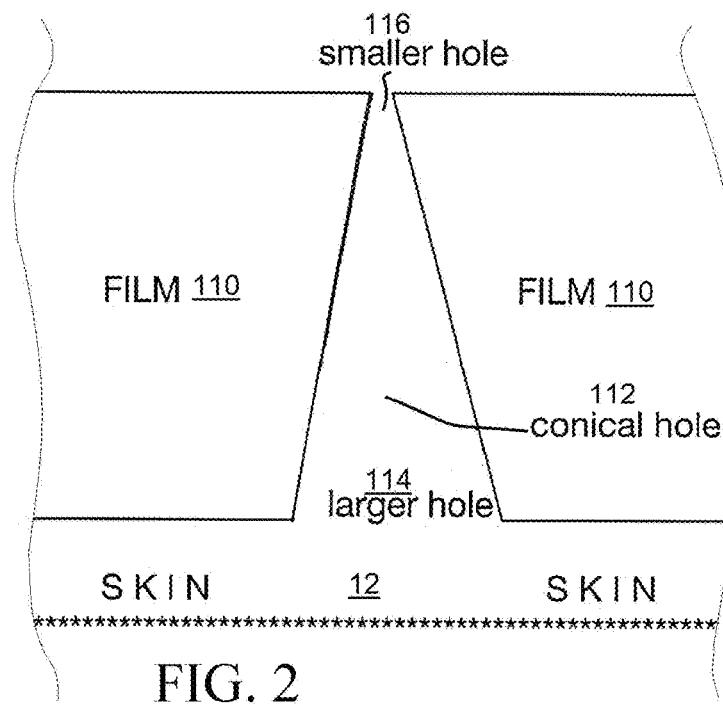
FIG. 2 is a schematic view of the perforated transparent breathable film forming the core of the Transparent Medical Facemask Composite according to the present invention.

The COVID-19 epidemic has reinforced the need for facemasks such as the facemask 100 of the present invention. Beyond the COVID-19 epidemic, there will likely be an increased need for publicly available face masks, for example mask mandates for travel will likely be quickly implemented as a means for minimizing transmission of diseases from localized hot spots. Transparent facemasks, such as the face mask 100 of the present invention serve several distinct purposes related to the use of masks.

One area relates to the use of facial recognition, such as has been implemented in certain security protocols in travel. Specifically this is referencing the ability of facial recognition to still be implemented with those wearing the facemask 100 of the invention. Facial recognition is a form of biometric artificial intelligence, which is able to identify an individual, or verify their identity, based on their face alone. The technology typically works by comparing a digital image or video frame to the faces in a database, matching up facial features and/or skin textures. To date, facial recognition has been deployed in a range of fields. Facebook uses facial recognition to identify human faces within digital images, while Apple have a system called Face ID, which is used to authenticate the identity of the user, preventing unauthorized access. The technology is also used within security services and law enforcement and, in particular regarding travel. has been widely adopted in airport security systems. The transparent facemask 100 of the present invention allows facial recognition systems to operate without disruption. Thus an airport, for example may allow patrons who wear mask 100 to have a more rapid security review (assuming that masks are required by the authorities to be worn by the patrons at this facility or desired to be worn by some of the patrons).

Another area is in interacting with hearing impaired. Non-transparent masks become an additional barrier in communicating for those who are deaf and hard of hearing. With 48 million Americans who are deaf or hard of hearing, according to a 2011 Johns Hopkins University study, the problem affects a significant part of the population on a daily level. The barriers in everyday communication are often intensified when deaf or hard of hearing people seek medical care—a longtime issue that has led to significant health impacts in the community and has become even more complicated in a pandemic. The transparent mask 100 of the present invention minimizes this added barrier by allowing deaf or hard of hearing to see the speakers mouth and lips.

A further area, analogous to the hearing impaired, is speech and language development. The research to date demonstrates that the visible articulations that babies normally see when others are talking play a key role in their acquisition of communication skills. Research also shows that babies who lip-read more have better language skills when they're older. Thus conventional masks likely hinder babies' acquisition of speech and language. The transparent mask 100 of the present invention minimizes this potential issue whether by a mask wearing parent or caregiver. The speech and language development is, of course not limited to babies, as stroke victims, for example, often require speech therapists. Stroke victims can often also require caregivers to be masked for other medical reasons. Again, the transparent mask 100 of the present invention minimizes this potential issue.

The present invention provides a Transparent Medical Facemask 100. The core or base layer of the composite of the invention is a transparent, clear film 100, about 0.5 to 3 mils, preferably 1 mil in thickness, which is breathable. The term about will reference +/10% unless otherwise indicated. A clear, polyurethane film 100 provides adequate breathability. Adequate breathability is defined herein as determined by ASTM E96 (as the test exists Jul. 1, 2020), procedure B, with results of 1000+ g/m2/24 hrs being results demonstrating "adequate breathability". The ASTM E96 testing methodology provides reliable values of water vapor transfer through permeable and semipermeable materials, expressed in suitable units. The film 110 and the mask 100 formed therewith yield equal to or greater than 1000 g/m2/24 hrs as measured in the ASTM E96 testing protocol.

The invention is not limited to polyurethane for the base layer film material 110 since any other clear film can be utilized, such as a polyvinyl chloride film. If a desired film material is not breathable, or where breathability of a select film 100 is to be enhanced, a pattern of conical, micro perforations 112 may be provided whereby the larger hole or opening 114 is closest to the skin 12 of the user and the smaller hole 116 is further from the skin 12. The film layer 110 of the preferred embodiments of the mask 100 of the invention contains micro, conical perforations 112 to increase breathability thereby expelling moisture vapor. A micro-perforation within the meaning of this application is one having a diameter less than 0.1".

The size and density of the conical perforation 112 pattern can vary. Generally the larger diameter opening 114 on the skin 12 facing side is between 0.02-0.08" in diameter, preferably about 0.04" in diameter, while the smaller diameter opening on the outward facing side is between 0.014-0.05" in diameter, preferably about 0.028" in diameter (wherein the smaller diameter always being less than 80% of the larger diameter), and there is a minimum pin density of 0.125×0.125 inch-0.250×0.250, and the perforations may be formed in any kind of pattern such a square or diamond.

Wearing a mask that adequately covers the nose and mouth is a highly effective barrier to viral infection but a mask needs the extra protection of an anti-biological coating 124 that disrupts a virus's ability to adhere to the film 110 surface and acts as a biocide. Nanotechnology implementation has made deep inroads in providing just such coatings based on historical materials such as silver, copper, gold and zinc. The metal based alloys have been approved by government agencies for use on masks to limit the spread of contaminants. Coatings 124 are usually applied to the film 110 after micro perforation and on the nano-scale to insure no breaching of the film 110. Microcellular foaming is an effective method of application. There are other classes of coatings 124 such as photocatalytic compounds which absorb UV light and produce hydroxyl radicals to destroy organic material on film surfaces. These light activated antimicrobials coatings 124 are also very useful. Both sides of the transparent film 110 are coated with an antiviral and/or antimicrobial solution or coating 124 to ensure thorough destruction of any pathogens that will come in contact with the mask 100. Some further coating 124 examples include the MAP-1 coating developed at the Hong Kong University of Science and Technology, quaternary ammonium polymer coating such as available from Allied Bioscience, Inc; and metal oxide and ceramic nanoparticle coating developed by Queen Mary, University of London. Preferably the antiviral and antimicrobial coating 124 is FDA approved.

The core or coated, micro-perforated, transparent film 110 is coupled, through an adhesive layer 122, to a plain weave fabric 120 that is of open construction such as a 36 warp×32 pick yarn count, made with fine yarns such as 30's singles both ways (warp and pick). The fabric 120 is preferably of cotton to reduce the likelihood of an allergic reaction to synthetic fibers such as polyolefin. It is not necessary to use fine yarn counts but heavier yarns may impede visibility. Higher construction counts will also reach a point where visibility is impaired and thus not desirable for the present invention.

The "open" construction of the fabric 120 of the present invention may be defined as between a fabric gauge of between 10 ct to 40 ct, and wherein the higher gauges are desirable because they give better coverage and comfort. There is also the ability to use transparent yarns so the fabric even when dense is transparent.

The adhesive 122 can be a web net to insure good adhesion yet not dense enough to block visibility. There are also other adhesive systems that could also serve in the laminating of the fabric 120 to the coated film 110 such as water based urethanes and acrylic PSA's. Suitable adhesive amounts include about 10 gsm-50 gsm.

Figure 4:
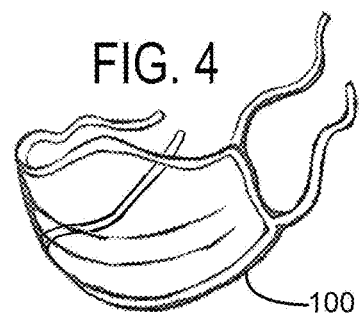
FIG. 4 is a schematic view of a Transparent Medical Facemask formed from the Composite of the present invention.
Figure 3:
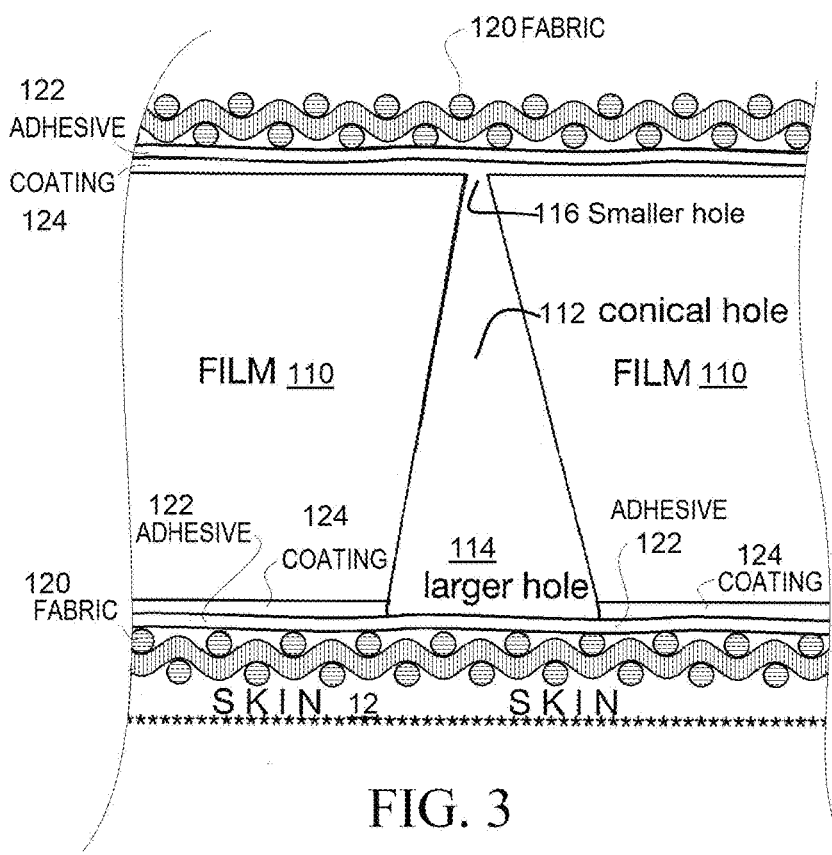
FIG. 3 is a schematic view of the Transparent Medical Facemask Composite according to the present invention.

The preferred composite of the present invention is to sandwich the coated perforated base layer 110 between two cotton or other natural fiber layers 120 as shown in FIG. 3. The composite mask 100 of the present invention can be used to form any conventional shape face mask 100 as generally shown in FIG. 4. The conventional face mask 100 includes attachment mechanism to secure the mask 100 to the user such as straps or loops that go around the user's ears or head (it is also known to use adhesives for such attachment). The conventional masks 100 may include a stiffening/bendable member to engage around the user's nose for conforming to the user. The composite mask 100 of the present invention can accommodate all these conventional features and yield a transparent mask 100 for the user. The mask 100 will minimize adverse skin reactions of the wearer due to the use of the fabric layer 120 adjacent the skin.

An alternative to the mask 100 of FIG. 3 is having fabric 120 only on the skin facing side, which would merely eliminate the outer fabric 120 and adhesive 122 layer.

While this invention has been particularly shown and described with references to the preferred embodiments thereof, it will be understood by those skilled in the art that various changes in form and details may be made therein without departing from the scope of the invention.

What is claimed is:

1. A facemask comprising
    a transparent, clear film, about 0.5 to 3 mils in thickness and breathable whereby it exhibits a water vapor transfer property equal to or greater than 1000 g/m2/24 hrs as measured in the ASTM E96 testing protocol, wherein the transparent clear film includes conical micro-perforations and wherein the larger diameter opening of each of the micro-perforations on the skin facing side is between 0.02-0.08" in diameter, and an anti-biological coating on at least one side of the transparent, clear film; and
    at least one fabric layer coupled to the clear film.
2. The facemask according to claim 1 wherein the larger diameter opening of each of the micro-perforations on the skin facing side is about 0.04" in diameter.
3. The facemask according to claim 1 wherein a smaller diameter opening of each of the micro-perforations on the outward facing side is between 0.014-0.05" in diameter.
4. The facemask according to claim 1 wherein a smaller diameter opening of each of the micro-perforations on the outward facing side is about 0.028" in diameter.
5. The facemask according to claim 1 wherein at least a portion of the perforations have a pin density of 0.125×0.125 inch –0.250×0.250 inch.
6. The facemask according to claim 1 wherein the anti-biological coating is on both sides of the transparent, clear film.
7. The facemask according to claim 1 wherein two fabric layers are coupled to the transparent clear film, one on each side of the film.
8. The facemask according to claim 7 wherein the two fabric layers are cotton.
9. A facemask comprising
    a transparent, clear film, about 0.5 to 3 mils in thickness which is breathable and having micro-perforations therein, wherein the micro-perforations are conical, and wherein a larger diameter opening of each of the micro-perforations faces the skin of a user, wherein the larger diameter opening of each of the micro-perforations on the skin facing side is between 0.02-0.08" in diameter, and wherein a smaller diameter opening of each of the micro-perforations on the outward facing side is between 0.014-0.05" in diameter;
    an anti-biological coating on at least one side of the transparent, clear film; and
    at least one fabric layer coupled via an adhesive layer to the clear film.
10. The facemask according to claim 9 wherein two fabric layers are coupled to the transparent clear film, one on each side of the film, and wherein the fabric layers are cotton.
11. The facemask according to claim 10 wherein the transparent, clear film is 1 mil in thickness.
12. The facemask according to claim 11 wherein the anti-biological coating is on both sides of the transparent, clear film.

* * * * *